United States Patent [19]

Park

[11] Patent Number: 5,290,532
[45] Date of Patent: Mar. 1, 1994

[54] PREPARATION OF HYDRIDOMAGNESIUM CHLORIDE

[75] Inventor: Won S. Park, Baton Rouge, La.

[73] Assignee: Ethyl Corporation, Richmond, Va.

[21] Appl. No.: 19,506

[22] Filed: Feb. 19, 1993

Related U.S. Application Data

[63] Continuation-in-part of Ser. No. 880,897, May 8, 1992, abandoned, which is a continuation of Ser. No. 562,224, Aug. 3, 1990, abandoned.

[51] Int. Cl.$^5$ .............................................. C01B 6/00
[52] U.S. Cl. .................................... 423/472; 423/644
[58] Field of Search ................................ 423/472, 644

[56] References Cited

U.S. PATENT DOCUMENTS 4,081,524  3/1978  Ashby .................................. 423/644

OTHER PUBLICATIONS

Ashby et al "Preparation and Characterization of HMg$AlH_4$, HMg$BH_4$ and H$_4$AlMg$BH_4$" Inorganic Chemistry vol. 16, No. 8 1977 pp. 2082–2085.

Primary Examiner—John Niebling
Assistant Examiner—Cybille Delacroix-Muirheid
Attorney, Agent, or Firm—Patricia J. Hogan

[57] ABSTRACT

Non-solvated hydridomagnesium chloride is prepared in high yield under moderate conditions by reacting magnesium hydride and magnesium chloride in a hydrocarbon solvent and in the presence of a trialkylaluminum catalyst.

15 Claims, No Drawings

PREPARATION OF HYDRIDOMAGNESIUM CHLORIDE

CROSS-REFERENCES TO RELATED APPLICATIONS

This application is a continuation-in-part of copending application Ser. No. 07/880,897, filed May 8, 1992, now abandoned, which in turn is a continuation of application Ser. No. 07/562,224, filed Aug. 3, 1990, now abandoned.

FIELD OF INVENTION

The invention relates to a process for preparing hydridomagnesium chloride from magnesium hydride and magnesium chloride.

BACKGROUND

Hydridomagnesium chloride, also known as chloromagnesium hydride, is a compound which has utility as an intermediate in the preparation of complex products, such as chloromagnesium aluminum hydride and chloromagnesium borohydride, and as a reducing agent for organic compounds such as ketones.

It is known that hydridomagnesium chloride can be prepared by sintering anhydrous magnesium chloride with magnesium hydride at high temperatures; and it is also known that the use of a tetrahydrofuran solvent permits its synthesis under mild conditions, as in Ashby et al., *Journal of the American Chemical Society*, Vol. 99, No. 1, 1977, pp. 310–311, Ashby et al., *Inorganic Chemistry*, Vol. 16, No. 8, 1977, pp. 2082–2085, Bogdanovic et al., *Z. Naturforsch.*, Vol. 39B, 1984, pp. 1001–1003, and Canadian Patent 1,135,480 (Bogdanovic).

Although each of the known methods of synthesizing hydridomagnesium chloride under mild conditions can be advantageously employed when it is desired to prepare and use the product in solution form, none of them is suitable for the production of solid HMgCl. As indicated in the references, it has not been found possible to isolate hydridomagnesium chloride from tetrahydrofuran.

SUMMARY OF INVENTION

It has been found that hydridomagnesium chloride can be prepared in high yield under moderate conditions when magnesium chloride is reacted with magnesium hydride in a hydrocarbon solvent and in the presence of a catalytically-effective amount of a trialkylaluminum.

DETAILED DESCRIPTION

The magnesium hydride employed in the reaction may be a commercial material, such as a powder or a dispersion in mineral oil; or it may be synthesized by known techniques, such as those of U.S. Pat. No. 4,725,419 (Marlett et al.) and Bogdanovic et al. *Angewandte Chemie, International Edition*, Vol. 19, 1980, pp. 818–819. Most preferably, it is a magnesium hydride which has increased activity by virtue of a relatively small particle size (such as a powder precipitated from solution as in the Bogdanovic et al. procedure) and which is relatively pure, e.g., >95% pure.

The magnesium chloride reactant is preferably at least technical grade, desirably having a purity >97%; and it is used in a substantially stoichiometric amount, i.e., an amount such as to provide 0.95–1.05 mols of magnesium chloride/mol of magnesium hydride. It may be added to the reaction vessel before, after, or at the same time as the magnesium hydride.

To permit the production of non-solvated, easily isolated hydridomagnesium chloride, the reaction is conducted in a hydrocarbon solvent. Such solvents include straight- and branched-chain alkanes and alkenes, such as n-heptane, 1-heptene, and other such hydrocarbons containing 2-12 carbons. However, the preferred solvents are aromatic hydrocarbons, such as toluene and benzene.

As already mentioned, the process of the invention is conducted in the presence of a catalytically-effective amount of a trialkylaluminum, this amount usually being in the range of about 0.8–8.0 mol %, based on either reactant. When the catalyst is triethylaluminum, as is frequently preferred, it ordinarily constitutes about 1–20 wt %, based on either reactant. In general, the trialkylaluminum may be one in which the alkyl groups are the same or different straight- or branched-chain groups, preferably alkyl groups containing 1–10 carbons, such as methyl, ethyl, n-propyl, isopropyl, n-butyl, isobutyl, n-hexyl, and n-heptyl groups— triethylaluminum and methyldiethylaluminum being exemplary.

The reaction is conducted with agitation at an elevated temperature and at atmospheric, sub-atmospheric, or super-atmospheric pressure by a batch or continuous process, preferably under ambient pressure and at a temperature in the range of about 75°–150° C. Although the reaction may be terminated at any earlier stage of reaction, it is ordinarily preferred to maintain the reaction conditions until the yield of hydridomagnesium chloride is at least about 75%, more preferably at least about 90%, and most preferably at least about 95%, based on the amount of magnesium in the reactants, in order to minimize contamination of the product with unreacted starting materials. The time required for the reaction to provide a desired yield varies, of course, with factors such as the reaction temperature and the amount and particular nature of the catalyst, but it is easily determined by routine experimentation. As a guideline, the substantially complete reaction of magnesium hydride and magnesium chloride in a process of the invention utilizing a catalytic amount of triethylaluminum and a temperature of 100° C. can require about 24–48 hours.

The product of the reaction is a non-solvated hydridomagnesium chloride which—unlike the product of known HMgCl syntheses under relatively mild conditions—can be easily separated from the remainder of the reaction mass by conventional techniques, such as filtration, distillation, and/or drying techniques, without being disproportionated back to magnesium hydride and magnesium chloride. As already indicated, this product may be prepared in very high yields, and it may also be prepared so as to be highly crystalline.

The following examples are given to illustrate the invention and are not intended as a limitation thereof.

EXAMPLE 1

Charge a Fisher-Porter reactor with 0.53 g (20 mmols) of an active magnesium hydride prepared by a Bogdanovic-type method, 1.90 g (20 mmols) of magnesium chloride, 0.1 mL (0.0837 g; 0.73 mmol) of triethylaluminum, and 20 mL of reagent grade toluene. Heat the resultant reaction mixture at 100° C. for 24 hours with vigorous magnetic stirring, and then filter to recover 2.42 g (>99% yield) of solid material. X-ray diffraction analysis of the recovered solids shows the product to be almost pure hydridomagnesium chloride.

EXAMPLE 2

Charge a Fisher-Porter tube in a dry box with a reaction mixture identical to that of Example 1 except for employing a commercial Aldrich product as the magnesium hydride. After maintaining the reactor tube in a 100° C. bath for 36 hours, filter the product mixture in a dry box to provide 20.77 g of filtrate and 2.40 g (98.8% recovered yield) of filter cake. X-ray diffraction analysis of the dried product shows it to be highly crystalline hydridomagnesium chloride. No other compounds are detectable.

What is claimed is:

1. A process which comprises reacting magnesium hydride and magnesium chloride in a hydrocarbon solvent and in the presence of a catalytically-effective amount of trialkylaluminum to form hydridomagnesium chloride.

2. The process of claim 1 wherein the magnesium hydride and magnesium chloride are reacted in substantially stoichiometric proportions.

3. The process of claim 1 wherein the trialkylaluminum is triethylaluminum.

4. The process of claim 3 wherein the amount of triethylaluminum is about 1-14 20 wt %, based on the magnesium hydride or magnesium chloride.

5. The process of claim 1 wherein the solvent is an aromatic hydrocarbon.

6. The process of claim 5 wherein the aromatic hydrocarbon is toluene.

7. The process of claim 1 which is conducted at a temperature in the range of about 75°-150° C. until the yield of hydridomagnesium chloride is at least about 90%, based on the amount of magnesium in the reactants.

8. The process of claim 7 wherein the temperature is about 100° C.

9. The process of claim 7 wherein the yield is at least about 95%.

10. The process of claim 1 wherein the hydridoniagnesium chloride is highly crystalline.

11. The process of claim 1 which comprises reacting magnesium hydride and magnesium chloride in a hydrocarbon solvent and in the presence of a catalytically-effective amount of trialkylaluminum to form hydridomagnesium chloride and recovering the hydridomagnesium chloride.

12. The process of claim 1 which comprises reacting substantially stoichiometric proportions of magnesium hydride and magnesium chloride in toluene and in the presence of a catalytic amount of triethylaluminum at a temperature in the range of about 75°-150° C. to form hydridomagnesium chloride in a yield of at least 95%, based on the amount of magnesium in the reactants.

13. The process of claim 12 wherein the temperature is about 100° C.

14. The process of claim 12 which comprises reacting substantially stoichiometric proportions of magnesium hydride and magnesium chloride in toluene and in the presence of a catalytic amount of triethylaluminum at a temperature in the range of about 75°-150° C. to form hydridomagnesium chloride in a yield of at least 95%, based on the amount of magnesium in the reactants, and recovering the hydridomagnesium chloride.

15. The process of claim 14 wherein the temperature is about 100° C.

* * * * *

UNITED STATES PATENT AND TRADEMARK OFFICE
CERTIFICATE OF CORRECTION

PATENT NO. : 5,290,532
DATED : March 1, 1994
INVENTOR(S) : Won S. Park

It is certified that error appears in the above-indentified patent and that said Letters Patent is hereby corrected as shown below:

Column 3, Line 28, reads "... is about 1-14 20 wt %, ..." and should read -- ... is about 1-20 wt %, ... --.

Signed and Sealed this

Second Day of August, 1994

Attest:

BRUCE LEHMAN

Attesting Officer          Commissioner of Patents and Trademarks